United States Patent
Russell

(10) Patent No.: US 7,194,459 B2
(45) Date of Patent: Mar. 20, 2007

(54) INFORMATION STORAGE AND RETRIEVAL DEVICE

(76) Inventor: Larry L. Russell, 200 Martinique Ave., Tiburon, CA (US) 94920

( * ) Notice: Subject to any disclaimer, the term of this patent is extended or adjusted under 35 U.S.C. 154(b) by 0 days.

(21) Appl. No.: 10/828,640

(22) Filed: Apr. 22, 2004

(65) Prior Publication Data

US 2004/0199503 A1    Oct. 7, 2004

Related U.S. Application Data

(62) Division of application No. 09/746,260, filed on Dec. 22, 2000, now Pat. No. 6,823,332.

(60) Provisional application No. 60/181,047, filed on Feb. 8, 2000, provisional application No. 60/171,620, filed on Dec. 23, 1999.

(51) Int. Cl.
*G06F 7/00*    (2006.01)

(52) U.S. Cl. .................. 707/3; 707/2; 707/10; 709/217

(58) Field of Classification Search ............... 707/1–5, 707/10; 455/427; 705/14, 26; 296/21; 725/42; 709/217
See application file for complete search history.

(56) References Cited

U.S. PATENT DOCUMENTS

| 5,926,116 | A  | * | 7/1999  | Kitano et al. ............... 340/988 |
| 6,269,361 | B1 | * | 7/2001  | Davis et al. ................... 707/3 |
| 6,332,127 | B1 | * | 12/2001 | Bandera et al. .............. 705/14 |
| 6,374,228 | B1 | * | 4/2002  | Litwin ......................... 705/14 |
| 6,430,605 | B2 | * | 8/2002  | Hunter ....................... 709/207 |
| 6,628,928 | B1 | * | 9/2003  | Crosby et al. ................ 455/77 |

\* cited by examiner

*Primary Examiner*—Tim Vo
*Assistant Examiner*—Hung Pham
(74) *Attorney, Agent, or Firm*—Karry W. Wang, Esq; Law Offices of K. W. Wang

(57) ABSTRACT

A method of providing directed search for a web site address identified via a media channel and a method for creating a database for such directed search are disclosed. A database is created by providing each information provider a plurality of identifier categories, and allowing each information provider to store on the database at least one identifier per applicable category that is associated with the identification of the web site address. A user may search the database and only retrieves a search response by inputting at least one of the identifiers already stored on the database.

9 Claims, 2 Drawing Sheets

Web Site Addresses Broadcast over Radio

To facilitate your search, please provide as much as possible the following information:

1. Name of city in which you were located: _____

2. Name of the event you were listening: _____

3. Subject matter that caught your interest: _____

4. Approximate Time of Day the web site address was broadcast: _____

5. Date on which the web site address was broadcast: _____

6. Call-letters of the radio station: _____

7. AM or FM: _____

8. Frequency of the radio station: _____

9. Name of the disc jockey/celebrity/personality when the web site was broadcast:
   _____

10. Name of a product or type of product associated with the web site address:
    _____

11. Type of service associated with the web site address: _____

Press the search button below when finished.

|SEARCH|

FIG. 2

INFORMATION STORAGE AND RETRIEVAL DEVICE

CROSS-REFERENCE TO RELATED APPLICATIONS

This application is a divisional of U.S. application Ser. No. 09/746,260 filed on Dec. 22, 2000 now U.S Pat. No. 6,823,332 and claims the benefit of both U.S. Provisional Application No. 60/171,620 filed on Dec. 23 ,1999, and U.S. Provisional Application No. 60/181,047 filed on Feb. 8, 2000.

FIELD OF THE INVENTION

The present invention relates generally to Internet search methods and, more particularly, to methods of providing directed Internet search for web sites identified via a media channel.

BACKGROUND OF THE INVENTION

More than 1.5 million new pages of information are created every day on the Internet, and this figure is still growing. (The Chicago Tribune, Feb. 4, 1999). In essence, Internet users are faced with trying to access an information network that is conservatively 1000 times larger than the largest conventional library. To sort through this information morass, an efficient search engine is indispensable.

Traditional Internet search engines, such as AltaVista™, perform a search by using key words as search parameters. For example, a user might use "airline" and "tickets" as key words to search for web sites that sell airline tickets online. In addition, a new breed of search engines was developed recently. Exemplified by Ask Jeeves™, these new search engines allow users to perform a search by asking a question. For example, a user might type in "How do I find cheap airline tickets?" to search for web sites that sell discounted airline tickets. The new search engines are reportedly more popular than the traditional ones because their search format is more natural and easier to use for the average user. When a New Yorker Magazine journalist asked Ask Jeeves™ how tall he is and the result was a reference to altitude rather than his height, however, it is clear that even the best current search pathway is neither efficient nor sufficient.

The main problem with most of today's search engines is that they return far too much irrelevant information. At least three factors contribute to this inefficiency. First, vague or improperly worded searches often return unwanted results. In addition, many web sites pay the search engines for the privilege of being listed first in a search. Consequently, the first five to ten search results are often less relevant than some of the other web sites listed. Finally, Internet search engines categorize web sites according to the content of the web sites' meta-tags; but many web sites do not use meta-tags. A meta-tag is a hypertext markup language (HTML) text coding hidden from normal view and located within a specifically designated portion of the HTML code that generates the web page. This special HTML text coding is used to designate key words that are communicated to search engines, allowing the search engines to determine the relevancy of the respective web site in response to a particular search query. Thus, web sites without meta-tags or with poorly designed meta-tags are often deemed irrelevant by a search engine.

Many web site owners advertise their web site addresses in the media to attempt to reach potential customers. For example, such advertisement may be announced over the radio or appear on a billboard. Because of the inefficiency of the current Internet search engines, however, if a potential customer hears or sees the advertisement, but is not in a position to accurately write down the web site address, the likelihood of the customer finding the web site advertised is minimal. Frequently, the advertised web address is a phonetic domain name which often makes the URL quite difficult to spell. As a result, the interest captured by the advertisement is often wasted when the potential customer cannot find the advertiser's web page. Therefore, there is a need for a directed search that would allow a potential customer to search for a desired web site advertiser without relying on proper search terms, key words or the existence and relevancy of the web site's meta-tags.

SUMMARY OF THE INVENTION

The present invention relates to methods of providing directed Internet search for web sites identified via media channels, which include radio, television, airline video broadcasts, billboards, and printed publications.

In accordance with the present invention, a preferred method of providing directed search for a web site address identified via a media channel comprises creating a database containing one or more web site identifiers associated with the identification of the web site address; permitting a user to search the database by inputting at least one of the web site identifiers; and providing to the user a search response including one or more web site addresses identified via the media channel.

In another preferred embodiment, a method for creating a directed search database of web sites identified via a media channel is disclosed. The method comprises providing each of a plurality of information providers access to a secured portion of the database; providing each information provider a plurality of identifier categories; allowing each information provider to store in the secured portion of the database a plurality of identifiers associated with a web site identified via a media channel, wherein each identifier corresponds to an identifier category; and creating a search query with the plurality of identifier categories, wherein a user searches the database by inputting at least one identifier in the search query, and a search result including a web site associated with the input identifier is provided when the search query is executed.

BRIEF DESCRIPTION OF THE DRAWINGS

FIG. 2 is a screen display illustrating an example of the preferred directed-search format of a search query in accordance with a preferred embodiment of the present invention.

DETAILED DESCRIPTION OF THE INVENTION

Figure 1:
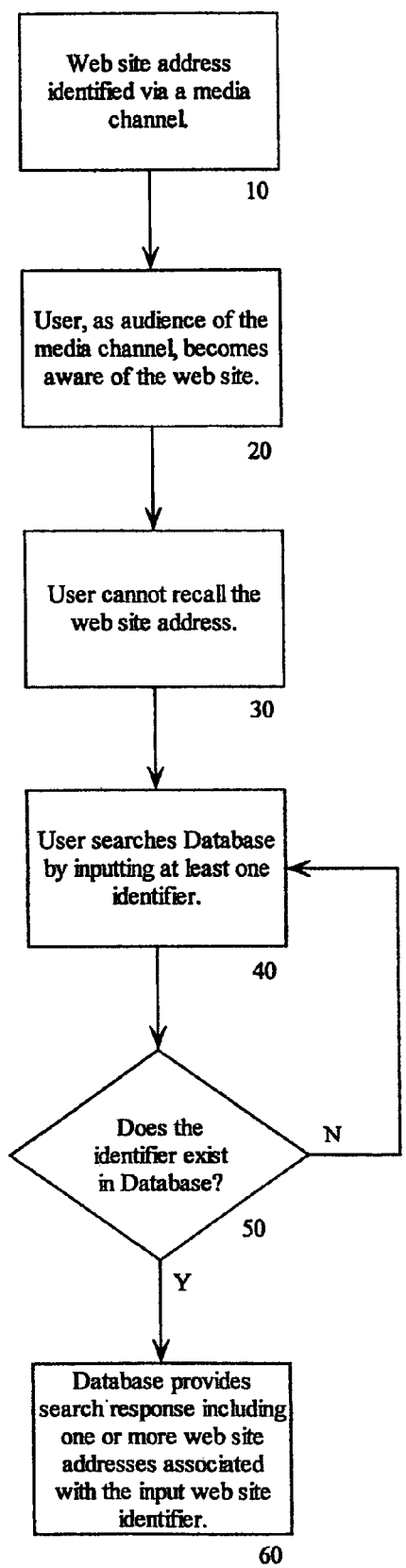
FIG. 1 is a flowchart illustrating the general schematic of a preferred embodiment of the present invention.

FIG. 1 illustrates the general schematic of a preferred embodiment of the present invention in the form of a flowchart. At block 10, a web site address is identified via a media channel, such as radio, television, airline video broadcast, a billboard, a printed publication, a sporting event, or a news event. The web site address may be identified in a commercial, an advertisement, a commentary, a product or service evaluation, an interview or any other forms of media information. At block 20, a user is exposed to the media channel and becomes aware of the web site address identified via the media channel. As block 30 shows, however, the user is unable to recall the web site address at a later time. This is often caused by the fact that the user is generally not in a position to accurately write down the web site address when it is identified via the media channel. For example, the user may be driving, without a writing instrument and paper, or otherwise distracted when the web site address is broadcast over the radio, the television, or advertised on a billboard. Additionally, the spelling of the web site name or address is often clever but not necessarily intuitive to the writer. However, the user is likely to remember where he or she saw or heard the information or the nature of the event that he or she was watching or listening at the time. Therefore, as block 40 indicates, a database is created for these users to search for web site addresses identified via media channels, utilizing what the users can recall to search for web site addresses that they do not remember.

The database is created by soliciting the advertisers and media channel operators for web site addresses identified via the media channel and for information associated with the media identification of the web site addresses. In other words, both the web site addresses and their corresponding "identifiers" are collected and compiled into the database. For example, if a web site address were broadcast over the radio, a list of identifiers would be solicited from the radio station, the web site owner or, if the broadcast were an advertisement, the advertising agency. Preferably, the identifiers include the location or city where the listener was located, the subject matter that caught the interest of the listener (e.g., pistachio nuts), the time of day the web site address was broadcast, the date on which the web site address was broadcast, the identifying call-letters for the station on which the web site address was broadcast, the frequency of the radio station on which the web site address was broadcast, any products associated with the broadcast web site address that were also broadcast, any services associated with the identified web site address that were also broadcast, and the name of the disc jockey or any celebrity or personality involved when the web site address was broadcast.

Similarly, for a web site address broadcast on television, the identifiers to be solicited preferably include the location or city where the listener was located, the subject matter that caught the interest of the listener, the time of day the web site address was broadcast, the date on which the web site address was broadcast, the identifying call-letters for the television station on which the web site address was broadcast, the identifying channel number for the station on which the web site address was broadcast, any products associated with the identified web site address that were also broadcast, any services associated with the identified web site address that were also broadcast, the name of the television show, and any celebrities or personalities involved when the web site address was broadcast.

For airline video and audio broadcasts, the identifiers to be solicited preferably include the video/audio name, the subject matter that caught the interest of the listener, the departure time of the flight on which a web site address was broadcast, the name of the departure city and state for the flight on which the web site address was broadcast, the arrival time of the flight on which the web site address was broadcast, the name of the arrival city and state for the flight on which the web site address was broadcast, the date of the flight on which the web site address was broadcast, the name of the airline of the flight on which the web site address was broadcast, the flight number of the flight on which the web site address was broadcast, any products associated with the identified web site address that were also broadcast, any services associated with the identified web site address that were also broadcast, and any celebrities or personalities associated with the identified web site address.

For a web site advertised on a billboard, the identifiers to be solicited preferably include the subject matter that caught the interest of the listener, the location of the billboard on which the web site address was advertised (e.g., the name of the city and street where the billboard was located and the name of the nearest cross street, or the name of the highway off of which the billboard was located and the name of the nearest highway exit etc.), any products associated with the advertised web site address that were also advertised, and any services associated with the advertised web site address that were also advertised on the billboard.

For a web site address identified in a printed publication, the identifiers to be solicited preferably include the name of the city where the publication was obtained, the name of the printed publication in which the web site address was identified, the issue date or number of the publication in which the web site address was identified, the volume number of the publication in which the web site address was identified, the title of the section of the publication in which the web site address was identified, the page number of the publication in which the web site address was identified, the title of an article in the publication in which the web site address was identified, any products associated with the identified web site address that were also identified, and any services associated with the identified web site address that were also identified in the publication.

Preferably, the compilation of the database is a do-it-yourself process. That is, each and every information provider is preferably given access to a portion of the database for uploading the information solicited and/or any other information the information provider deems relevant, such as information on a product or service, or information about the web site or its owner. The information uploading or collection is preferably processed in an organized manner (i.e., identical for each information provider) such that all information can be retrieved quickly and accurately. In other words, the database is preferably password protected, and each and every information provider is given a password to essentially create a protected sub-database within the database accessible only by inputting the corresponding password. Preferably, the content of the sub-database can be updated or edited electronically by using the same password. For example, a radio station may use a password given to the station to create a sub-database containing all of the web site addresses featured or advertised on the radio for a given week. The sub-database may also include hyperlinks to the advertised or featured web sites. The radio station may decide to update the content of the sub-database daily or weekly by adding new web site addresses. The radio station may choose to keep any input web site addresses in the sub-database for a longer period of time, say a year, and create different lists of web site addresses for different weeks, all included in the sub-database. Therefore, the compilation of the database is continuous and may be real-time.

Still referring to FIG. 1, as block 40 shows, a user can search the database for a web site address identified via a media channel by inputting at least one identifier in the search query. Preferably, different identifier questionnaires or categories are provided on the query page to help a user conduct a directed or guided search. An example of such a directed search is illustrated in FIG. 2, which will be discussed in detail below. Referring again to FIG. 1, after at least one identifier is input and the search command is executed, the database checks its content for the identifier input, as shown at decision block 50. If the input matches an identifier stored in the database, the database provides the user a search result containing the web site address associated with the identifier, as block 60 illustrates. Occasionally, an identifier may be associated with more than one web site address. In that case, every web site that is associated with the identifier would be provided in the search result, and, preferably, the user would be asked to fine-tune his or her search by inputting at least one more identifier.

For example, suppose the web site bn.com was advertised on the radio station KBIG, FM 101.3, at 7:00 PM on May 5, 2000 in the San Francisco Bay Area, and the advertisement was about the various books one can purchase online at bn.com. Suppose a user cannot recall the web site address "www.bn.com." The user may search in the radio section of the database for the web site address, as shown in FIG. 2, which illustrates a preferred format for a search query comprising a plurality of guiding questionnaires and a search execution button 80. Preferably, the user begins his or her search by typing in at least one identifier or answer to a questionnaire. In the instant example, the user may type in "San Francisco" in line 1 after the search field "City in which you were located"; "19:00" or "7:00 PM" in line 4 after the search field "Time of Day the web site address was broadcast"; "May 5, 2000" in line 5, after the search field "Date on which the web site address was broadcast"; "KBIG" in line 6, after the search field "Call-letters of the radio station"; "FM" in line 7, after the search field "AM or FM"; and "101.3" in line 8, after the search field "Frequency of the radio station". After the search command is executed by electronically pressing the search button 80, the database checks its content for the five identifiers entered. Because the identifiers match those stored in the database for bn.com, the address "www.bn.com" and other relevant information will be provided in the search result. A hyperlink to bn.com is preferably provided, and the user may click on the hyperlink to reach the bn.com web site.

Now, suppose the web site etoys.com was also advertised on the same radio station in the same commercial time slot, on the same date, and the advertisement was about the web site's toy selection. The above identifiers entered would have retrieved both "www.bn.com" and "www.etoys.com" because all of the five identifiers entered above are associated with each one of these two web sites. Because there are only two items in the search result, the user may simply scroll up and down the search result page and choose the correct web site, www.bn.com. However, if numerous items were retrieved, the user may wish to fine-tune his or her search request. The user has the option to go back to the query page and provide more information to fine-tune the search parameter. In the instant example, the user may type in a sixth identifier, "books", in line 3, after the search field "Subject matter which caught your interest" or in line 10, after the search field "Name of a product or type of products associated with the web site address." Because only the bn.com advertisement was about books, the only web site address included in the search result would be www.bn.com.

In a preferred embodiment of the present invention, the database comprises a search query page for each media channel. FIG. 2 illustrates such a search query page for radio broadcasts. In another preferred embodiment, the database comprises one query page for all of the media channels, and the search fields comprise all of the identifier categories. In yet another preferred embodiment, the database comprises a plurality of query pages, one query page for a number of similar media channels. For example, the database may include one query page for television and radio broadcasts, and another for billboards and printed publications.

Preferably, the database uses Cold Fusion or a similar search engine software to execute searches. Preferably, the database is stored on a web site accessible via the Internet. Three preferable web site addresses for the database are www.eAdLocator.com, www.WhereDidIHearThat.com and www.WhereDidISeeThat.com. As the web site names suggest, a user may access these web sites to search for a web site address the user "heard" or "saw," but could not remember the web site address. Preferably, therefore, a user would search www.WhereDidIHearThat.com for a web site address identified via radio, TV audio broadcast, and the like; and the user would search www.WhereDidISeeThat.com for a web site address identified on a billboard, TV, airline video broadcast, in a printed publication, or similar media channels.

Although the invention herein has been described with reference to particular embodiments, it is to be understood that the embodiments are merely illustrative of the principles and application of the present invention. It is therefore to be understood that various modifications may be made to the above mentioned embodiments and that other arrangements may be devised without departing from the spirit and scope of the present invention as defined by the appended claims.

What is claimed is:

1. A method of providing directed search for a web site address advertised on an outdoor billboard, the method comprising:
   creating a database containing web site identifiers input by an advertiser associated with the advertisement of the web site address on the outdoor billboard;
   inputting at least two of the web site identifiers by a user to search the database; and
   providing to the user a search response including one or more advertised web site addresses that correspond to the input at least two of the web site identifiers,
   wherein the input at least two web site identifiers include at least two members of the group consisting of:
   an estimated location where the user saw the advertisement of the web site address on the outdoor billboard;
   a time of day or date or dates when the user saw the advertisement of the web site address on the outdoor billboard; and
   a product or service associated with the web site address advertised on the outdoor billboard.

2. The method of claim 1, wherein the search response further includes information related to one or more web sites associated with the one or more advertised web site addresses.

3. The method of claim 1, wherein the group further consists of:
   a subject matter of interest associated with the web site address advertised on the outdoor billboard; and
   the name of a host, celebrity or personality associated with the advertisement of the web site address on the outdoor billboard.

4. The method of claim 1, wherein the estimated location where the user saw the advertisement of the web site address on the outdoor billboard is defined by one or more members of the group consisting of:
   the name of a highway;
   the name of a highway exit;

the name of a street;

the name of a building; and the name of a place of interest.

5. The method of claim 1, wherein the database is password protected.

6. A method for creating and searching a database of web site addresses advertised on an outdoor billboard, comprising:

provolving each of a plurality of information providers access to a secured portion of the database;

providing each information provider one or more identifier categories;

allowing each information provider to store in the secured portion of the database one or more web site identifiers associated with a web site address advertised on the outdoor billboard, each web site identifier corresponding to an identifier category; and creating a search query with the one or more identifier categories, wherein a user searches the database by inputting at least two web site identifiers in the created search query, and providing a search result to the user including at least one web site associated with the input at least two web site identifiers, wherein the input at least two web site identifiers include at least two members of the group consisting of:

an estimated location where the user saw the advertisement of the web site address on the outdoor billboard;

a time of day or date or dates when the user saw the advertisement of the web site address on the outdoor billboard; and a product or service associated with the web site address advertised on the outdoor billboard.

7. The method of claim 6, wherein the secured portion of the database is protected by password.

8. The method of claim 6, further comprising allowing each information provider to store in the secured portion of the database non-identifier information relating to the web site.

9. The method of claim 6, wherein the group further consists of:

a subject matter of interest associated with the web site address advertised on the billboard; and the name of a host, celebrity or personality associated with the advertisement the web site address on the outdoor billboard.

* * * * *